April 24, 1956 F. J. BINGLEY 2,743,312

COLOR TELEVISION REGISTRATION CONTROL SYSTEM

Filed April 18, 1951 3 Sheets-Sheet 1

INVENTOR.
FRANK J. BINGLEY
BY
Allen V. Hazeltine
ATTORNEY

INVENTOR.
FRANK J. BINGLEY
BY
Allen V. Hazeltine
ATTORNEY

April 24, 1956 F. J. BINGLEY 2,743,312

COLOR TELEVISION REGISTRATION CONTROL SYSTEM

Filed April 18, 1951 3 Sheets-Sheet 3

INVENTOR.
FRANK J. BINGLEY
BY
Allen V. Hazeltine
ATTORNEY

United States Patent Office 2,743,312
Patented Apr. 24, 1956

2,743,312

COLOR TELEVISION REGISTRATION CONTROL SYSTEM

Frank J. Bingley, Meadowbrook, Pa., assignor to Philco Corporation, Philadelphia, Pa., a corporation of Pennsylvania Application April 18, 1951, Serial No. 221,661

15 Claims. (Cl. 178—5.4)

The present invention relates to electrical systems and more particularly to cathode-ray systems in which the position of the electron beam relative to a beam intercepting member of the tube is controlled by an indexing member so arranged in cooperative relationship with the beam intercepting member to produce a signal whose time of occurrence is indicative of the time at which the cathode-ray beam attains a predetermined position.

The invention is particularly adapted for and will be described in connection with, color television image producing systems utilizing a single cathode-ray tube having a beam intercepting, image forming screen member comprising vertical stripes of luminescent materials. These stripes are preferably arranged in laterally-displaced color triplets, each triplet comprising three vertical phosphor stripes which respond to electron impingement to produce light of different primary colors. The primary colors selected and the order of arrangement of the stripes may be such that in normally scanning the stripes in a transverse manner the cathode-ray beam produces red, green, and blue light successively. From a color television receiver there may then be supplied a color video signal having consecutive portions or components, each indicative of a different primary color component of a televised scene, which components are utilized to control the intensity of the cathode-ray beam.

In a color television system of the so-called "field sequential" type each consecutive color component of the video signal has a duration equal to the duration of one field scan of the image. Accordingly, when a cathode-ray tube having a vertically striped luminescent screen, as above described, is used for the image reproduction in a field sequential color television system, the color stripes producing a given primary color are excited by the cathode-ray beam in a corresponding manner. More specifically, during one scanning field of the electron beam, only those stripes producing a first primary color are excited to luminescence, during the second scanning field only those stripes producing a second primary color are excited, and in the succeeding scanning field only those stripes producing the third primary color are excited. Since the successive scanning fields follow each other in rapid succession a blending of the primary colors to produce the desired image color is effected.

Correspondingly, in a line sequential color television system, each consecutive color component of the video signal has a duration equal to the duration of one line scan of the image. When a tube with a vertically striped phosphor screen is used, the scanning procedure may be such that during a given line scan of the cathode-ray tube screen the luminescent stripes producing a given one of the three primary colors are excited, in the succeeding line scan the stripes producing a second of the primary colors are excited, and in the following line scan the stripes producing the third primary color are excited.

Similar considerations apply in a so-called "dot-sequential" color television system wherein the consecutive color components occur at the rate of occurrence of the elements of the image to be reproduced whereby during each scanning line all of the stripes are consecutively excited, the stripes of each color group being excited in proportion to the primary color content of the respective element of the image at the transmitter.

For proper color rendition, it is required that the phosphor stripes producing each of the primary colors of light be impinged by the cathode-ray beam in synchronism with the contemporaneous value of the video signal which represents the corresponding color component of the televised image and which varies the intensity of the beam proportionally to the amplitude of the color component. However, because the rate at which the beam scans across the phosphor stripes of the screen may be variable, due, for example, to nonlinearities of the beam deflecting signal, and/or because the phosphor stripes are inevitably formed to a greater or lesser degree with a non-uniform distribution across the surface of the beam intercepting screen, such a synchronous relationship between the instant of occurrence of a given color component signal and the impingement of the beam on a luminescent stripe of the corresponding color does not normally occur in practice. It has therefore been proposed to control the position of the beam in a positive manner by deriving from the tube structure, signals indicative of the instantaneous position of the cathode-ray beam upon the image-forming screen, utilizing these indexing signals to achieve the desired synchronization of the impingement of the beam on the cathode-ray tube screen and the occurrence of the color component signals. Such indexing signals may be derived, for example, from a plurality of stripe members arranged on the beam intercepting screen structure each adjacent a triplet so that when the beam scans the screen the indexing stripes are excited in spaced time sequence relative to the scanning of the color triplets and a series of pulses is generated in a suitable output electrode system of the cathode-ray tube.

The indexing stripes may comprise a material having secondary-emissive properties which differ from the secondary-emissive properties of the remaining portions of the beam intercepting structure. For example, the indexing stripes may consist of a high atomic number material such as gold, platinum or tungsten or may consist of certain mixtures including cesium or cesium oxide and the remainder of the beam intercepting structure may be provided with a coating of a material having a detectably different secondary-emissive ratio such as a coating of aluminum, which coating also serves as a light reflecting mirror for the phosphor stripes in accordance with well known practice. With such an arrangement the indexing signals may be derived from a collector electrode arranged in the vicinity of the screen structure. Alternately, the indexing stripes may consist of a fluorescent material such as zinc oxide having a spectral output in the non-visible light region and the indexing signals may be derived from a suitable photo-electric cell arranged for example, in a side wall portion of the cathode-ray tube out of the path of the cathode-ray beam and facing the beam impinging surface of the screen structure.

In practice there exists the danger that the normally detectable voltage indicating the impingement of the beam onto the indexing stripes may be masked or at least contaminated by spurious voltages. More particularly, it is found that at the high accelerating voltages of the order of 10 to 20 kilovolts used in the cathode-ray tubes for the systems under consideration, the difference in the secondary-emissive ratio of the materials of the indexing stripes and of the remainder of the screen structure is relatively small and the presence of video signals and noise voltages in the collector electrode system of the tube may significantly diminish the effectiveness of the indexing signal as a synchronizing control.

Similarly, in those instances in which the indexing signal is produced by means of a photo-electric detector and an indexing stripe comprising a fluorescent material which produces light in the non-visible region of the spectrum, the detector may be also actuated by soft X-rays which are produced by the high voltage beam or by extraneous light from sources external to the cathode-ray tube or from the phosphor stripes of the color triplets, the latter light in some instances penetrating the aluminum mirror coating superimposed on the color stripes.

It is an object of the invention to provide an improved cathode-ray tube system of the type in which the position of the electron beam relative to a beam intercepting member is controlled by an indexing member.

Another object of the invention is to provide a cathode-ray tube system of the type in which the position of the electron beam is controlled by an indexing signal and in which irregularities of the indexing signal do not significantly affect the desired synchronous relationship between the position of the cathode-ray beam and the input signal modifying the intensity of the beam.

Another object of the invention is to provide a cathode-ray tube system in which only minor demands are made on the indexing signal.

A further object of the invention is to provide a cathode-ray tube system particularly adapted for reproducing a color television image, in which system absolute synchronism is achieved between the position of the cathode-ray beam and the color video signal applied to the cathode-ray tube.

These and further objects of the invention will appear as the specification progresses.

In accordance with the invention the foregoing objects are achieved by a cathode-ray tube system comprising a plurality of synchronizing controls so interrelated that the position of the cathode-ray beam and the input signal applied thereto are synchronized to a first order approximation by one or more of the control quantities derived from the system and final and absolute synchronization of the position of the cathode-ray beam is effected by an indexing signal derived from the cathode-ray tube and operating under conditions whereby only minimum standards for the said indexing signal are required. It is a feature of the system of the invention that absolute synchronization is maintained even in the temporary absence of either the indexing signal or of one or more of the synchronizing control quantities derived from the system.

More specifically, and in a color television system utilizing a cathode-ray tube in which the image producing screen comprises a plurality of groups of luminescent stripes emitting light of three primary colors as above described, the foregoing objects are achieved by means of a system in which the color information applied to the cathode-ray beam and the position of the cathode-ray beam are synchronized to a first order approximation by a first control quantity proportional to the average velocity of scanning of the beam and by a second control quantity proportional to variations of the said average velocity. The final and absolute control of synchronization is achieved by a third control quantity derived from the said indexing signal and indicative of the instantaneous departure of the position of the beam with respect to a particular luminescent stripe of the image forming screen structure.

The invention will be described in greater detail with reference to the appended drawings forming part of the specification and in which.

Figure 1:
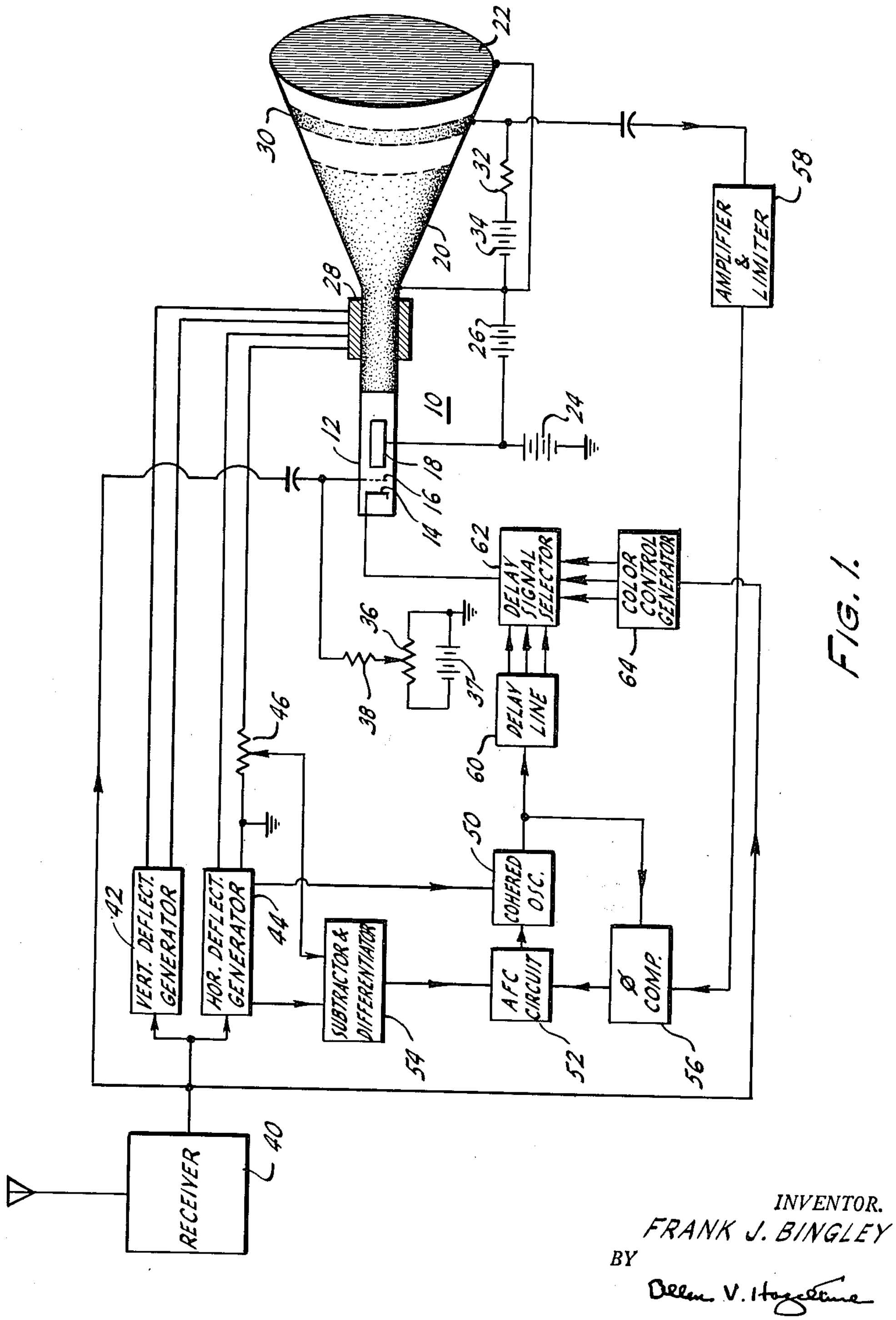
Figure 1 is a schematic diagram of a cathode-ray tube system in accordance with one embodiment of the invention as applied to a color television system of the field sequential type.

Referring to Figure 1, the cathode-ray tube system there shown comprises a cathode-ray tube 10, containing within an evacuated envelope 12, a conventional beam generating and accelerating electrode system comprising a cathode 14, a control electrode 16 for varying the intensity of the beam, a first anode or focusing electrode 18, and a beam accelerating electrode 20 which may consist of a conductive coating on the inner wall of the envelope and which terminates at a point spaced from the end face 22 of the tube in conformance with well established practice. Suitable heating means (not shown) are provided for maintaining the cathode 14 at its operating temperature. The electrode system so defined is energized by a suitable source of potential shown as a battery 24 having its negative pole connected to ground and its positive pole connected to the anode 18 and by a battery 26 connected in series with battery 24 and having its positive pole connected to the accelerating electrode 20. In practice the source 24 has a potential of 1 to 3 kilovolts whereas the source 26 has a potential of the order of 10 to 20 kilovolts. The control electrode 16 is maintained at a desired operating potential by means of a potentiometer 36 shunting a battery 37 and the movable arm of which is connected to the electrode 16 through a resistor 38.

A deflection yoke 28 containing horizontal and vertical deflection coils of conventional design is provided for deflecting the generated electron beam across the face plate 22 of the cathode-ray tube to form a raster thereon.

The end face 22 of the tube is provided with a beam intercepting structure comprising vertical stripes of luminescent materials which stripes are arranged in laterally-displaced color triplets, each triplet comprising three vertical phosphor stripes which respond to electron impingement to produce light of the different primary colors. The primary colors chosen and the order of arrangement of the stripes may be such that a continuously energized cathode-ray beam produces red, green and blue light successively when horizontally scanned across the beam intercepting structure.

Figure 4:
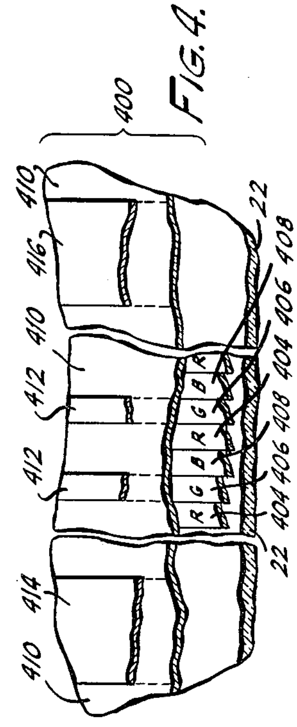
Figure 4 is a cross-sectional view partially broken away showing one form of a beam intercepting structure suitable for the cathode-ray tube systems of the invention.

One form of beam intercepting structure suitable for the system of the invention is shown in Figure 4. In the arrangement there shown, the beam intercepting structure shown as 400 is formed directly on the face plate 22 of the tube, however, it should be well understood that the structure 400 may be formed on a suitable light transparent base which is independent of the face plate of the cathode-ray tube and may be spaced therefrom.

In the arrangement shown, the face plate 22, which in practice consists of glass having preferably substantially uniform transmission characteristics for the various colors in the visible spectrum, is provided with a plurality of groups of elongated parallel arranged stripes 404, 406 and 408 of phosphor material which, upon impingement of the cathode-ray beam, fluoresce to produce light of three different primary colors. For example, the stripes 404 may consist of a phosphor which upon excitation produces red light, the stripes 406 may consist of a phosphor which produces green light and the stripes 408 may consist of a phosphor which produces blue light. Each of the groups of stripes may be termed a color triplet and, as will be noted, the sequence of the stripes is repeated in consecutive order over the area of the structure 400. Suitable materials constituting the stripes 404, 406 and 408 are well known to those skilled in the art as well as the method of applying the same to the face plate 22 and the statement of further details concerning the same is believed to be unnecessary.

In the arrangement shown in Figure 4, the indexing signal for establishing the position of the beam on the beam intercepting structure is produced by indexing stripes of a given secondary-emissive ratio differing from the secondary emissive ratio of the remainder of the beam intercepting structure and upon which the cathode-ray beam impinges during the horizontal scanning thereof. For this purpose the structure 400 further comprises a thin, electron permeable conducting layer 410 of low secondary emissivity and superimposed indexing stripes 412 of relatively high secondary emissivity. The layer 410 is arranged as a coating on the phosphor stripes 404, 406 and 408 and preferably further constitutes a mirror for reflecting light generated at the phosphor stripes. In practice the layer 410 is a light reflecting aluminum coating which is formed in well known manner. Other metals such as magnesium and beryllium capable of forming a coating in a manner similar to aluminum and having a secondary emissive ratio detectably different from that of the material of the indexing stripes may also be used. The indexing stripes 412 are arranged on the coating 410 over a corresponding one of the phosphor stripes of each of the color triplets and may consist of gold or of other high atomic number metals such as platinum or tungsten or may consist of a mixture containing cesium or cesium oxide.

In the system shown in Figure 1, the beam intercepting structure so constituted is connected to the positive pole of the source 26 by means of a suitable lead attached to the coating 410. To complete the index signal generating circuit there is interposed between the end of the accelerating electrode 20 and the beam intercepting structure of the face plate 22 an output collector electrode 30 consisting of a ring shaped coating for example of graphite or silver. Electrode 30 is energized through a load impedance 32 by a suitable source 34, shown as a battery and having a potential of the order of 3 kilovolts. The indexing stripes 412 operate to produce a pulse of secondary electrons each time the cathode-ray beam impinges thereon so that there will be formed across the load impedance 32 an indexing signal having an amplitude variation indicative of the absolute position of the cathode-ray beam.

While, in the specific arrangement shown, there is provided an indexing stripe 402 for each of the color triplets, it is apparent that the structure may be modified by using a lesser number of index stripes, i. e. an index stripe for every two or three color triplets whereby the indexing signal produced has a corresponding subharmonic frequency. Such a modification may be indicated with beam intercepting structures of unusual uniformity.

The cathode-ray tube system so far described may be used for the reproduction of a color image using field sequential scanning principles by appropriately selectively exciting the phosphor stripes as the beam horizontally scans the beam intercepting structure. More particularly, and with reference to the beam intercepting structure shown in Figure 4, during a first field scanning period of the cathode-ray beam in its movement transverse to the color triplets, the beam is given periodically a high intensity value whereby only the red light producing stripes 404 are excited to the required light producing level. During the following field scanning period only the green stripes 406 are excited to the required light producing level and similarly during the third field scanning period only the blue stripes 408 are excited to the light producing level. Preferably, the beam is not fully extinguished between excitation periods of the red and blue stripes during the red and blue field scanning periods thereby ensuring that during these scanning periods a least a given minimum excitation of the index stripes 412 which are positioned over the green stripes 406 is brought about. This may be effected by a suitable adjustment of the potentiometer 36 controlling the bias voltage applied to control electrode 16. In some instances the attenuation of the beam intensity to only a given minimum value during the red and blue scanning periods may bring about a low level excitation of the green stripes. However, in practice it is found that the resulting color contamination if indeed it be of a visually detectable level, merely changes the background level of the reproduced image to a minor extent.

For applying a picture signal to the cathode-ray tube 10 and to control the movement of the cathode-ray beam in synchronism with the occurrence of the color information of the picture signal, the system shown in Figure 1 comprises a receiver 40 of conventional design and adapted to produce at the output thereof a video signal having a first signal component containing the detail of the image to be reproduced and a second signal component containing the usual synchronizing pulse groups for the horizontal and vertical scanning of the image. The video signal may further contain a suitable color phasing component which may be formed as a modification of or may be superimposed on the appropriate vertical scanning pulse groups.

The picture signal component is applied directly to the control electrode 16 of the tube 10 through a suitable video amplifier (not shown) if such an amplifier is found necessary to bring the picture signal to the required level.

For deflecting the beam across the face of the cathode-ray tube there are provided a vertical deflection signal generator 42 which is coupled to the vertical deflection coil of the yoke 28, and a horizontal deflection signal generator 44 which is coupled to the horizontal deflection coil of the yoke 28 through a potentiometer 46. Generators 42 and 44 are coupled to the receiver 40 and synchronized by the synchronizing signal component of the video wave. The design of generators 42 and 44 conforms to standard practice and as is well known to those skilled in the art such generators usually comprise an oscillator section which produces a linearly varying sawtooth voltage having a frequency in synchronism with the synchronizing pulses applied to the oscillator and an output section coupled to the oscillator for producing the required deflection current which to a greater or lesser degree may be nonlinear in waveform.

For controlling the intensity of the beam, whereby during each of the color fields only those stripes of fluorescent material producing a given one of the three primary colors are excited to the required visual intensity level, and in succeeding color fields the remaining stripes producing the other primary colors are successively excited to the required level, there are provided a cohered oscillator 50, a delay line 60 coupled to the oscillator 50, a delay signal selector 62 having its input coupled to the delay line 60 and its output connected to the cathode 14 of the tube 10, and a control generator 64 for actuating the selector 62.

The design of cohered oscillator 50 conforms to standard practice and may be of the type having a free running rate determined by the electrical constants thereof and is further characterized in that its frequency and phase may be controlled to a first order approximation by means of a periodic signal having a frequency different from but bearing a fixed relationship to the desired operating frequency. Furthermore the frequency and phase of the oscillator may be controlled within narrow prescribed limits by means of a control voltage which may act to vary the effective value of one or more of the electrical constants of the oscillator or produce variations of a reactance coupled to the oscillator. A suitable form for the oscillator 50 is shown for example, in the publication "Waveforms" by B. Chance et al., published by McGraw-Hill Book Company, Inc. of New York, 1949, on pages 142 et seq. thereof. The free running rate of the oscillator 50 approximates the rate at which the electron beam encounters stripes of a given primary color in its horizontal scanning across the beam intercepting structure of the cathode-ray tube. More particularly, if it be assumed that the particular beam intercepting structure contained in the tube 10 has about 400 groups of color stripes or triplets, and the horizontal scanning frequency is 15750 cycles/sec. in accordance with present transmission standards, the free running frequency of the cohered oscillator 50 is approximately 7 mc./sec.

The delay line 60 is adapted to produce three actuating voltages at the frequency of the generator 50. Delay line 60 may comprise a series of filter sections designed in accordance with principles well known in the art so as to provide a total delay for signals passing therethrough which is at least as great as the average time required for the cathode-ray beam to traverse one color triplet of the beam intercepting structure, and is preferably terminated in its characteristic impedance so as to minimize reflections from the termination thereof. When using a beam intercepting structure as shown in Figure 4 wherein the individual color stripes are of substantially uniform distribution throughout the width of the color triplet, the output voltages of the delay line may be uniformly phase related, i. e. spaced 120° apart. For a non-uniform distribution of the color stripes throughout the width of the color triplet a corresponding non-uniform phase relationship between the delay voltages should be maintained.

The delay signal selector 62 operates to selectively apply the appropriate one of the delay voltages from the delay line 60 to the cathode 14 whereby, during a given scanning field, the cathode-ray beam is made to assume its light producing value at proper phase intervals to energize the stripes of a given primary color. More particularly, and if it be assumed for the moment that the movement of the beam is in absolute synchronism with the applied picture signal and that the color stripes of the beam intercepting structure are uniformly distributed and in proper phase relationship to the picture signal, it will be apparent that a given selected one of the delay voltages from the delay line 60 will cause the beam to excite to visual intensity only those luminescent stripes of a given color. During the next scanning field, the selector 62 operates to select a second one of the delayed voltages and accordingly the stripes of a second color will be excited. In similar manner, the selector will select the third delayed voltage during the third scanning field and only those stripes producing the third primary color will be excited to visual intensity.

The design of the selector 62 may conform to practice well known in the art. Thus in one specific arrangement it may comprise three discharge tubes having anodes connected in common, having each a first control grid connected individually to one of the delay voltages and each having a second control grid adapted to render the tube conductive only when an actuating signal voltage is applied thereto. For actuating such a selector 62, the generator 64 may be of the form which produces appropriately phased voltage pulses in synchronism with a suitable color phase controlling signal contained in the video wave. For example, the generator 64 may consist of three flip-flop multivibrators connected in series with appropriate delay networks interposed between successive multivibrators whereby the second is energized by the first one-third of a cycle of the color phasing signal following the actuation of the first and the third multivibrator is energized one-third of a cycle following the actuation of the second. By a suitable selection of the time constants of the multivibrators they may be made to conduct for a period equal to one-third of the period of the color phase signal and thus produce an actuating voltage having a duration equal to the duration of one scanning field.

The control of the cohered oscillator 50 at the correct frequency to a first approximation is achieved by means of a synchronizing pulse signal occurring at the line scanning rate and which may be derived conveniently from the output circuit of the horizontal scanning signal generator 44 as shown. Since this synchronizing pulse signal has a fixed frequency and phase position as established by the horizontal synchronizing pulses of the incoming video wave, the oscillator 50, even though it may be of different initial operating frequency, will be cohered with the synchronizing pulse signal so that, at least during the start of each consecutive line scan, the cohered frequency and phase of the oscillator will be the same.

In order to vary the frequency of the oscillator 50 about its average frequency value to thereby compensate for nonlinearities of the horizontal deflection current during each line scanning period, a frequency correction voltage proportional to the departure from linearity is applied to the cohered oscillator 50 through an automatic frequency control circuit 52. More particularly, by means of the potentiometer 46 a first voltage is derived proportional to the horizontal deflecting current applied to the cathode-ray tube. This voltage is compared with a linearly varying sawtooth voltage derived from the generator 44 by means of a subtractor and differentiator 54 and the resultant differentiated subtracted voltage is applied as a control voltage to the AFC circuit 52. Such a linear deflection voltage, serving as a comparison standard, is available, as above pointed out, from the oscillator section of the generator 44 which is of standard design. However, it is apparent that the desired linearly varying voltage may be produced by a system apart from the generator 44, for example, by a system in which a capacitor is charged at a constant rate through a saturated diode tube or through a pentode tube and suitable means, such as a discharge tube operated in synchronism with the horizontal scanning pulses, is used to discharge the capacitor at the end of each scanning line period. In a suitable arrangement the AFC circuit 52 may consist of a reactance tube the reactance value of which is varied by a control voltage applied to a control grid thereof. Such reactance tubes and their mode of operation are well known to those skilled in the art and further description thereof is believed to be unnecessary.

It is thus seen that, by means of the control effected by the pulse signal derived from the horizontal deflection generator 44, the average frequency and the starting phase of the cohered oscillator 50 are adjusted in synchronism with the scanning rate of the electron beam transverse to the color stripes of the beam intercepting structure. Furthermore, variations from the average velocity of the beam due to non-linearities of the beam scanning rate bring about, through the AFC circuit 52, corresponding frequency variations of the cohered oscillator and thus correspondingly change the instants when the beam is intensified to actuate a particular color stripe of the beam intercepting structure.

To ensure absolute frequency and phase synchronism between the cohered oscillator 50 and the position of the beam as it impinges on the fluorescent stripes of the beam intercepting member of the tube, the indexing signal derived from the collector electrode 30 and developed across the load resistor 32 is applied as a further control quantity to the cohered oscillator 50. More particularly, and as specifically shown in Figure 1, the indexing signal is compared with the output signal of the cohered oscillator 50 in a phase comparator 56 to produce a control potential proportional to the instantaneous phase difference between the said signals. Since the index signal occurs at a multiplicity of instants during each line scanning period and its phase at each instant is established by the fixed geometry of the beam intercepting structure of the tube, the control potential derived therefrom and applied to the AFC circuit 52 correspondingly varies the instantaneous frequency of the oscillator 50 throughout each line scanning period to bring the oscillator into absolute frequency and phase synchronism with the position of the beam.

As above pointed out, during the field scanning periods devoted to scanning of the red and blue phosphor stripes 402 and 406 the beam is not fully extinguished during its travel over the green phosphor stripe 404 and the superposed index stripe 412. By this arrangement it is ensured that during each field scanning period the indexing stripes 412 will be excited at least to a minimum extent and an indexing signal will be produced during each field scan. In order to compensate for the intensity difference between the indexing signal produced during the field scanning period of the green stripe 406, at which time the beam impinging on the index stripes 412 has a relatively high intensity value, and the indexing signal produced during the field scanning periods of the red and blue stripes 404 and 408, at which times the beam impinging on stripes 412 has a smaller intensity value, there may be provided a suitable amplifier and limiter 58 arranged between the collector electrode 30 and the phase comparator 56. Amplifier 58 is characterized by having sufficient gain to amplify the indexing signal supplied thereto to a conveniently usable level and may be adapted to do so without distortion of the indexing signal waveform, although this is not essential so long as the phase characteristics of the amplifier are such that the positive peaks of the amplifier output signals therefrom occur in predetermined time relationship to the times of occurrence of peaks produced in the signal at the load resistor 32 in response to impingement of the cathode-ray beam on the indexing stripes.

Figure 2:
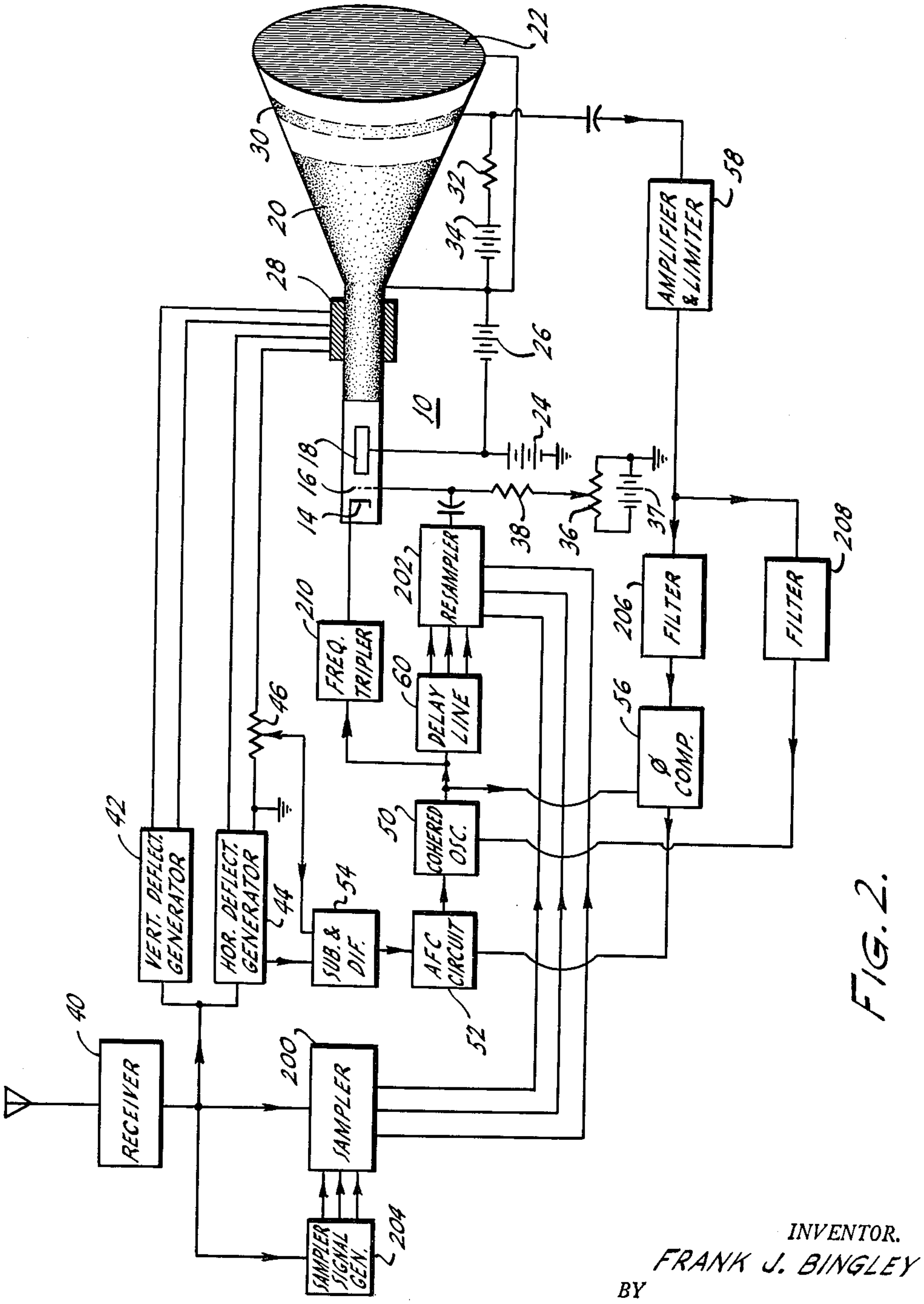
Figure 2 is a schematic diagram of a cathode-ray tube system in accordance with another embodiment of the invention as applied to a color television system of the dot-sequential type.

The system shown in Figure 2 embodies the principles of the invention as applied to a dot-sequential color television system. As will be noted, many of the components of the system shown are similar to the components of the system of Figure 1, and accordingly, these elements have been indicated by the same reference numerals. Thus, in the system shown in Figure 2, the televised image is reproduced by means of a cathode-ray tube 10 similar to that above described and which may embody additional features as noted below. The tube 10 comprises a cathode 14, a control electrode 16, a focusing electrode 18, an accelerating electrode 20, a collector electrode 30 and a face plate 22 carrying a beam intercepting system embodying longitudinally arranged phosphor stripes. Suitable sources 24, 26, 34 and 37 are supplied for energizing the electrodes, the collector electrode 30 being connected to its source 34 through a load resistance 32. A horizontal and vertical deflection yoke 28 is similarly supplied for deflecting the cathode-ray beam to form a raster on the beam intercepting structure.

The beam intercepting structure may be of the form previously described and shown in Figure 4 and may further comprise two line indexing stripe systems 414 and 416 arranged at opposite ends of the scanning line travel and serving a purpose later to be more fully set forth. The stripe systems 414 and 416, each of which may consist of a single relatively wide stripe element as shown or may consist of a plurality of spaced narrow stripe elements, are arranged on the coating 410 and may consist of a material having a secondary emissive ratio detectably different from the secondary emissive ratio of the material of the coating 410. In practice the stripes 416 consist of the same material as the stripes 412.

In the dot-sequential method of scanning to produce a color television image, the phosphor stripes 404, 406 and 408 are consecutively excited by the cathode-ray beam. There is then supplied to the intensity control electrode of the cathode-ray tube a voltage having consecutively occurring variations proportional to the primary color content of the elements of the image to be reproduced, whereby, in its travel transverse to the vertically arranged stripes, the beam excites the stripes of each color group or triplet in proportion to the primary color content of the elements of the image.

For applying a picture signal to the cathode-ray tube 10 and to control the movement of the cathode-ray beam, the system shown in Figure 2 further comprises a receiver 40 for producing a video wave having a picture signal component and a synchronizing signal component for controlling the vertical and horizontal scanning movement of the cathode-ray beam. The video wave may further contain a color phasing signal component which may be of the form of a burst signal occurring during the so-called back-porch interval of the horizontal synchronizing pulses, and which has a frequency equal to the rate of occurrence of the color samples of the picture signal component.

The synchronizing components are applied to suitable vertical and horizontal deflection generators 42 and 44 respectively, which energize the deflection yoke 28 in a manner similar to that of the system of Figure 1; the horizontal deflection generator being applied to the horizontal deflection coil through a potentiometer 46 as previously noted.

The picture component of the video wave is applied to the control electrode 16 of the tube 10 through the intermediary of a sampler 200 and a resampler 202. Sampler 200 operates to sample the video wave at spaced time intervals to produce three color component signals bearing the desired color information constituting the image to be reproduced. The design of sampler 200 may conform to standard practice and the sampler may consist, for example, of three dual grid sampling tubes having one of their respective grids connected in common to the receiver 40 and having individual output circuits in which the individual color component signals are produced. The sampling tubes are operated in sequence at relative phase positions and at the frequency at which the color components appear in the input video wave and for this purpose the sampler 200 is energized by a sampling signal generator 204 which provides appropriately phased synchronous voltages which may be applied to the second grids of the respective sampling tubes of the sampler 200. The sampling signal generator 204 is in turn synchronized at the sampling frequency and in proper phase relationship by means of the color phasing signal component contained in the video wave as above pointed out. The generator 204 may preferably be of the type described in the copending application of Joseph C. Tellier, Serial No. 197,551, filed November 25, 1950.

The individual color component signals so produced are in turn resampled by the resampler 202 at a rate and in a sequence determined by the horizontal scanning frequency of the cathode-ray beam and the number and sequence of color stripes of the triplets contained in the beam intercepting structure. In a suitable form, the resampler 202 may comprise three dual grid sampling tubes having their anodes connected in common to the control electrode 16 and having one of their respective grids energized by one of each of the color component signals. The resampling tubes are made consecutively conductive in proper phase and at the frequency of incidence by the beam on the color stripes by means of suitable control potentials applied to the respective second grids thereof. The said control potentials may be derived from a delay line 60 energized by a cohered oscillator 50 operating at a frequency synchronous with the impingement of the cathode-ray beam on the phosphor stripe triplets.

Whereas in the system specifically shown in Figure 1 the cohered oscillator 50 is controlled in phase and frequency to a first order of approximation by a synchronizing pulse voltage at the horizontal scanning rate as derived from the horizontal deflection generator 44, in the system specifically shown in Figure 2 such synchronization of the cohered oscillator 50 is effected by a pulse generated within the cathode-ray tube 10 by the electron beam. More particularly, and as will appear from a consideration of the beam intercepting structure shown in Figure 4, at the beginning of each line scanning period the cathode-ray beam impinges on the relatively broad index stripe 414, thereby producing at the collector electrode 30 of tube 10 a large well defined index pulse. Since the edge of the stripe 414 has a fixed position relative to the first encountered color triplet as determined by the fixed geometry of the cathode-ray tube structure, and occurs at the line scanning rate, the line pulses so formed may advantageously be used to control the frequency and phase of the cohered oscillator 50 at the start of each scanning line period. The signal produced by the stripe 416 positioned at the end of the scanning line travel may serve to increase the effective length of the line index pulse thereby ensuring a greater accuracy of the phase of the oscillator 50 at the start of each scanning line.

In order to vary the frequency of the cohered oscillator 50 to compensate for departures from linearity of the horizontal scanning rate during the line scanning period, the oscillator 50 is further controlled as in the system shown in Figure 1 by means of an AFC circuit 52 which is energized by a subtractor and differentiator 54 to which a comparison linear sawtooth voltage from the generator 44 and a voltage proportional to the scanning current as derived from the potentiometer 46 are applied.

The final and absolute control for the oscillator 50 insuring synchronism between the position of the beam and the color signal on the control grid 16 is provided by the index signals derived from the stripes 412 of the beam intercepting structure of the tube. The so produced index signals, as in the case of the system shown in Figure 1, are applied to a phase comparator 56 to which the output of the oscillator 50 is also applied and which energizes the AFC circuit 52.

To improve the gating of the picture signals applied to the control grid 16, i. e. to more sharply define the duration of each of the bursts of the cathode-ray beam as it excites consecutive color stripes of the beam intercepting structure, the cathode 14 may be energized by a signal in proper polarity and having a frequency of three times the frequency at which the resampler 202 operates. Such a gating signal may be derived from a frequency tripler 210 coupled to the output of the oscillator 50.

Suitable filters 206 and 208 may be contained in the connection from the collector electrode 30 to separate the pulses at the horizontal scanning rate and the pulses at the color triplet repetition rate prior to applying the same to the cohered oscillator 50 and the phase comparator 56 respectively.

It will be evident that the cohered oscillator 50 of the system of Figure 2 may be synchronized to a first approximation by pulses at the horizontal scanning rate derived from the horizontal deflection generator 44 in the manner shown in Figure 1 and similarly, the oscillator 50 of the system of Figure 1 may be synchronized by pulses produced by an index stripe 414 in the manner shown in Figure 2.

Figure 3:
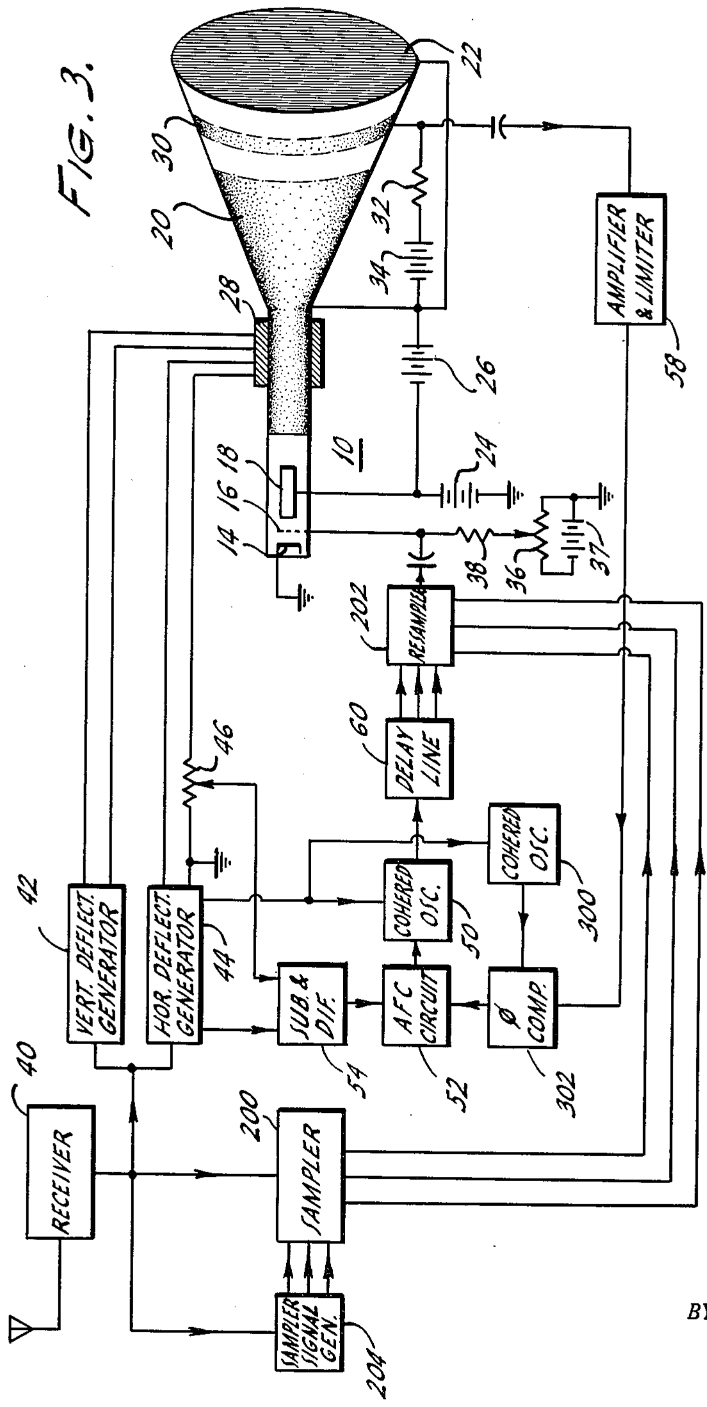
Figure 3 is a schematic diagram of a cathode-ray tube system in accordance with a further embodiment of the invention as applied to a color television system of the dot-sequential type.

Whereas, in the system illustrated in Figures 1 and 2, the absolute phase synchronization of the cohered oscillator 50 is effected by an indexing stripe signal bearing an integer relationship to the number of color triplets contained in the beam intercepting structure of the cathode-ray tube, the principles of the invention are equally applicable to systems in which the cathode-ray tube comprises a beam intercepting structure having indexing stripes which bear a non-integer relationship to the number of color triplets. A system operating under these conditions and based on dot-sequential scanning principles is shown in Figure 3. As will be noted, the system of Figure 3 is similar to that shown in Figure 2 in that there is provided a cathode-ray tube 10 having beam generating and deflecting elements similar to those previously described. The system further comprises a receiver 40, vertical and horizontal deflection generators 42 and 44 respectively, coupled to the deflecting yoke 28 of the tube 10, a color signal sampler 200 actuated by a sampling signal generator 204, both of which are coupled to receiver 40 as previously described, and a resampler 202 actuated by a cohered oscillator 50 through a delay line 60 and energizing the control electrode 16 of the tube 10. All of these elements are similar to the correspondingly numbered elements shown in Figures 1 and 2 and operate in similar manner.

Figure 5:
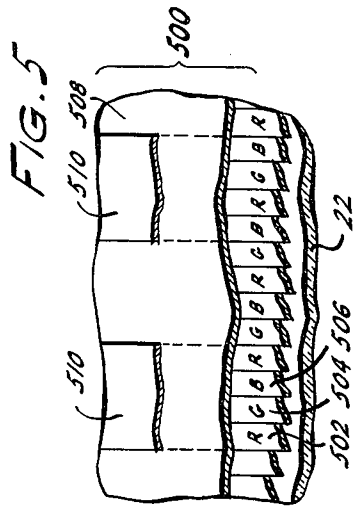
Figure 5 is a cross-sectional view partially broken away showing another form of a beam intercepting structure suitable for the cathode-ray tube systems of the invention.

One form of beam intercepting structure for the tube 10 of Figure 3 is shown in Figure 5. The structure there shown as 500 is formed on the face plate 22 of the cathode-ray tube 10 and comprises longitudinally arranged stripes 502, 504 and 506 of phosphor material adapted to produce light of three primary colors upon impingement by a cathode-ray beam. The stripes are arranged in consecutive order across the surface of the face plate to provide a plurality of color groups or triplets each group having a lateral dimension corresponding to the width of a picture element of the image to be reproduced.

Arranged over the stripes 502, 504 and 506 is an electron permeable coating 508 of a material having a relatively low secondary emission ratio, said coating preferably further serving as a light reflecting surface. As in the case of the coating 410 of the structure shown in Figure 4, the coating 508 may consist of aluminum, magnesium or the like. The structure 500 further comprises indexing stripes 510 consisting of a material having a secondary emissive ratio detectably different from the material of the coating 508—for example, of a high atomic number metal such as gold, tungsten or the like, or of a material such as cesium or cesium oxide as previously set forth in connection with the stripes 412 of the structure of Figure 4. The stripes 510 operate to produce an indexing signal at the collector electrode 30 of the tube 10 when impinged by the cathode-ray beam in its transverse movement across the beam intercepting structure.

It will be noted that the position and extent of the stripes 510 are such that a non-integer relationship obtains between number of stripes 510 and the number of color triplets contained in the beam intercepting structure. Accordingly, when scanning the beam intercepting structure, the frequency of the indexing signal so produced will bear a non-integer relationship to the rate at which the color triplets are scanned by the beam and hence a non-integer relationship to the operating frequency of the cohered oscillator 50 establishing the rate at which the color sample signals are applied to the beam intensity control electrode of the tube 10.

In order to synchronize the frequency and phase of the oscillator 50 to the frequency at which the color triplets of the structure 500 are encountered by the horizontally scanning beam, the cohered oscillator 50 is controlled to a first approximation by a synchronizing pulse signal derived from the horizontal deflection generator 44 in the manner previously described in connection with Figure 1. Furthermore, to vary the frequency of the oscillator 50 to thereby compensate for non-linearities of the horizontal scanning current, a voltage proportional to the horizontal scanning current is derived from a potentiometer 46 and compared with a linear sawtooth voltage derived from the generator 44 in a subtractor and differentiator 54; the control potential so produced being applied to the AFC circuit 52 coupled to the oscillator 50 in the manner previously described.

The absolute phase and frequency synchronization of the oscillator 50 is controlled by the indexing signal derived from the beam intercepting structure of the cathode-ray tube, and for this purpose there is provided a cohered oscillator 300 having a free running frequency approximating the average frequency of the indexing signal produced at the collector electrode 30. The cohered oscillator is synchronized at the absolute average frequency of the indexing signal by means of a pulse signal applied to it from the horizontal deflection generator 44. The construction of oscillator 300 may be basically similar to that of oscillator 50, due consideration in the selection of the constants thereof being given in view of the different operating frequency.

The wave generated by the oscillator 300 and the indexing signal produced at the collector electrode 30 are applied to a phase comparator 302 and the resulting control potential is applied to the AFC circuit 52 to provide the final and absolute control of the oscillator 50.

As in the case of the system of Figure 1, it will be apparent that the oscillator 50 may be initially synchronized by a signal at the horizontal scanning rate derived from the tube 10 as in the case of the system shown in Figure 2 whereby the beam intercepting structure 500 further comprises line frequency indexing stripes arranged at the beginning and end of travel of the beam as shown in Figure 4.

While I have described my invention by means of specific examples and in specific embodiments, I do not wish to be limited thereto for obvious modifications will occur to those skilled in the art without departing from the spirit and scope of the invention.

What I claim is:

1. A cathode-ray tube system comprising, a cathode-ray tube having a source of an electron beam, means to control the intensity of said beam and a beam intercepting structure, said beam intercepting structure comprising a plurality of first portions longitudinally arranged in succession in a first configuration of given distribution and adapted to produce a given response upon impingement by said beam and further comprising a plurality of second portions longitudinally arranged in a second given configuration indicative of said first configuration and adapted to produce a control signal indicative of the position of said beam on said beam intercepting structure, input means for a first wave indicative of the value of given intelligence and a second wave recurring at a given nominal frequency, means responsive to said second wave to periodically deflect said beam across said beam intercepting structure at said given nominal frequency and at a given average velocity rate, and means to periodically energize said beam control means with said intelligence wave at a rate in synchronism with the rate of impingement of said beam on said successively arranged first portions, said latter means comprising an oscillation source having a free running frequency approximating the frequency of impingement of said beam on said successive first portions, first means to synchronize said source at a second frequency approximating said impingement frequency and proportional to said first given nominal frequency, second means to vary the frequency of said source about said second frequency proportionally to departures of the deflection velocity of said beam from said average velocity rate, and third means responsive to said control signal to vary the frequency of said source over short time intervals proportionally to departures of the configuration of said second portions from a configuration of predetermined distribution.

2. A cathode-ray tube system as claimed in claim 1 wherein said second portions comprise a plurality of stripe members spaced apart and bearing an integer relationship to the number of said first portions.

3. A cathode-ray tube system as claimed in claim 1 wherein said second portions comprise a plurality of stripe members spaced apart and bearing a non-integer relationship to the number of said first portions.

4. A cathode-ray tube system as claimed in claim 1 wherein said first means to synchronize said oscillation source at said second frequency comprises means to derive from said deflecting means a synchronizing signal having a frequency equal to said first given nominal frequency and means to apply said signal as a control quantity to said source.

5. A cathode-ray tube system as claimed in claim 1 wherein said beam intercepting structure further comprises a third portion adapted to produce upon impingement by said beam a control wave having a frequency equal to said first given nominal frequency, and further comprising means to apply said control wave to said oscillation source to thereby synchronize the frequency of said source at said second frequency.

6. A cathode-ray tube system as claimed in claim 1 wherein said second means to vary the frequency of said source about said second frequency proportionally to departures of the deflection velocity of said beam from said average velocity rate, comprises means to derive a first potential having an amplitude proportional to the time position of said beam, means to derive a second potential having an amplitude linearly varying with time, means to compare said first and second potentials to produce a resultant potential, and means to control the frequency of said source proportionally to said resultant potential.

7. A cathode-ray tube system for producing a color television image, comprising a cathode-ray tube having a source of an electron beam, means to control the intensity of said beam and a beam intercepting structure, said beam intercepting structure comprising a plurality of groups of stripes of fluorescent material longitudinally arranged in succession in a first configuration of given distribution, each of said stripes producing light of a different color upon impingement by said beam, and said structure further comprising a plurality of second stripe members spaced apart and longitudinally arranged in a second given configuration indicative of said first configuration and adapted to produce a control signal indicative of the position of said beam on said beam intercepting structure, input means for a first wave having consecutive portions each indicative of a given color constituent of said image and a second synchronizing wave recurring at a given nominal frequency, means to periodically deflect said beam across said beam intercepting structure at said given nominal frequency and at a given average velocity rate, and means to periodically energize said beam control means with said first wave at a rate in synchronism with the rate of impingement of said beam on said successively arranged groups of stripes, said latter means comprising an oscillation source having a free running frequency approximating the frequency of impingement of said beam on said successive first portions, first means to synchronize said source at a second frequency approximating said impingement frequency and proportional to said first given nominal frequency, second means to vary the frequency of said source about said second frequency proportionally to departures of the deflection velocity of said beam from said average velocity rate, and third means responsive to said control signal to vary the frequency of said source over short time intervals proportionally to departures of the configuration of said second stripe members from a configuration of uniform distribution.

8. A cathode-ray tube system as claimed in claim 7 wherein said oscillation source comprises a cohered oscillator and wherein said second means to vary the frequency of said source about said second frequency proportionally to departures of the deflection velocity of said beam from said average velocity rate comprises: means to derive from said deflecting means a first electrical quantity having an amplitude proportional to the time position of said beam, means to derive a second electrical quantity having an amplitude linearly varying with time, means to compare said first and second quantities to produce a resultant quantity, and means to control the frequency of said cohered oscillator proportionally to said resultant quantity.

9. A cathode-ray tube system as claimed in claim 8 wherein said first means to synchronize said cohered oscillator at said second frequency comprises means to derive from said deflecting means a synchronizing signal having a frequency equal to said first given nominal frequency, and means to apply said signal as a control quantity to said cohered oscillator.

10. A cathode-ray tube system as claimed in claim 8 wherein said beam intercepting structure further comprises a third stripe member arranged at one end of the scanning travel of said beam and adapted to produce a wave having a frequency equal to said first given nominal frequency, and means to apply said wave as a control quantity to said cohered oscillator to synchronize said cohered oscillator at said second frequency.

11. A cathode-ray tube system for producing a color television image, comprising a cathode-ray tube having a source of an electron beam, means to control the intensity of said beam and a beam intercepting structure, said beam intercepting structure comprising a plurality of first portions longitudinally arranged in succession in a first configuration of given distribution and further comprising a plurality of second stripe portions spaced apart and longitudinally arranged in a second given configuration indicative of said first configuration and adapted to produce a control signal indicative of the position of said beam on said beam intercepting structure, said first portions each comprising a plurality of stripes of fluorescent material each producing light of a different color upon impingement by said beam, input means for a video wave having a first component having consecutive portions each indicative of a given color constituent of said image, having a second synchronizing component recurring at a given nominal frequency and having a third component indicative of the time position of the consecutive portions of said first component, means responsive to said second component to periodically deflect said beam across said beam intercepting structure at said given frequency and at a given average velocity rate, means to apply said first component of said video wave to said beam control means, a cohered oscillation source having a free running frequency approximating the frequency of impingement of said beam on said successive first portions, first means to synchronize said source at a second frequency approximating said impingement frequency and proportional to said first given nominal frequency, means to derive from said deflecting means a first electrical quantity having an amplitude proportional to the time position of said beam, means to derive a second electrical quantity having an amplitude linearly varying with time, means to compare said first and second quantities to produce a resultant quantity, second means responsive to said resultant quantity to vary the frequency of said source about said second frequency proportionally to departures of the deflection velocity of said beam from said average velocity rate, third means responsive to said control signal to vary the frequency of said oscillator source over short time intervals proportional to departures of the configuration of said second portions from a configuration of uniform distribution, and means responsive to said third component and to the oscillation of said cohered source to periodically energize said beam control means at a rate in synchronism with the rate of impingement of said beam on said successively arranged first portions and in time position in synchronism with the said third component of said video wave.

12. A cathode-ray tube system as claimed in claim 11 wherein said first means to synchronize said source at said second frequency comprises means to derive from said deflecting means a synchronizing signal having a frequency equal to said first given nominal frequency, and means to apply said signal as a control quantity to said cohered oscillation source.

13. A cathode-ray tube system for producing a color television image, comprising a cathode-ray tube having a source of an electron beam, means to control the intensity of said beam and a beam intercepting structure, said beam intercepting structure comprising a plurality of first portions longitudinally arranged in succession in a first configuration of given distribution and further comprising a plurality of second stripe portions spaced apart and longitudinally arranged in a second given configuration indicative of said first configuration and adapted to produce a control signal indicative of the position of said beam on said beam intercepting structure, said first portions each comprising a plurality of stripes of fluorescent material each producing light of a different color upon impingement by said beam, input means for a wave having a first component having consecutive portions each indicative of a given color constituent of said image, having a second synchronizing component recurring at a given nominal frequency and having a third component indicative of the time position of the consecutive portions of said first component, means responsive to said second component to periodically deflect said beam across said beam intercepting structure at said given nominal frequency and at a given average velocity rate, means responsive to said third component of said video wave to derive from said first component individual color signals proportional to the value of the said color constituents of said image, a cohered oscillation source having a free running frequency approximating the frequency of impingement of said beam on said successive first portions, first means to synchronize said source at a second frequency approximating said impingement frequency and proportional to said first given nominal frequency, means to derive from said deflecting means a first electrical quantity having an amplitude proportional to the time position of said beam, means to derive a second electrical quantity having an amplitude linearly varying with time, means to compare said first and second quantities to produce a resultant quantity, second means responsive to said resultant quantity to vary the frequency of said source about said second frequency proportionally to departures of the deflection velocity of said beam from said average velocity rate, third means responsive to said control signal to vary the frequency of said oscillation source over short time intervals proportionally to departures of the configuration of said second portions from a configuration of uniform distribution, and means responsive to the oscillation of said cohered source to sequentially apply said color signals to said beam control means in synchronism with the impingement of the beam on said fluorescent stripes.

14. A cathode-ray tube system as claimed in claim 13 wherein said first means to synchronize said cohered oscillation source at said second frequency comprises means to derive from said deflecting means a synchronizing signal having a frequency equal to said first given nominal frequency, and means to apply said signal as a control quantity to said cohered oscillation source.

15. A cathode-ray tube system as claimed in claim 13 wherein said beam intercepting structure further comprises a third stripe member arranged at one end of the scanning travel of said beam and adapted to produce a wave having a frequency equal to said first given nominal frequency and means to apply said wave as a control quantity to said cohered oscillation source to synchronize said cohered source at said second frequency.

References Cited in the file of this patent

UNITED STATES PATENTS

| | | |
|---|---|---|
| 2,415,059 | Zworykin | Jan. 28, 1947 |
| 2,490,812 | Huffman | Dec. 13, 1949 |
| 2,530,431 | Huffman | Nov. 21, 1950 |
| 2,545,325 | Weimer | Mar. 13, 1951 |

OTHER REFERENCES

"Recent Developments in Color Synchronization in the RCA Color Television System," RCA Bulletin on Color Television, February 1950.